(12) United States Patent
Lobisser

(10) Patent No.: US 9,988,094 B1
(45) Date of Patent: Jun. 5, 2018

(54) INTERNALLY STIFFENED BODY STRUCTURE

(71) Applicant: G. Kyle Lobisser, Los Altos Hills, CA (US)

(72) Inventor: G. Kyle Lobisser, Los Altos Hills, CA (US)

(73) Assignee: Apple Inc., Cupertino, CA (US)

(*) Notice: Subject to any disclaimer, the term of this patent is extended or adjusted under 35 U.S.C. 154(b) by 0 days. days.

(21) Appl. No.: 15/369,107

(22) Filed: Dec. 5, 2016

Related U.S. Application Data

(60) Provisional application No. 62/264,017, filed on Dec. 7, 2015.

(51) Int. Cl.
*B62D 25/04* (2006.01)
*B62D 21/15* (2006.01)
*B62D 29/00* (2006.01)

(52) U.S. Cl.
CPC ............. *B62D 25/04* (2013.01); *B62D 21/15* (2013.01); *B62D 29/008* (2013.01); *B60Y 2306/01* (2013.01)

(58) Field of Classification Search
CPC ....... B62D 21/15; B62D 25/04; B62D 29/008
USPC ..... 296/187.12, 193.06, 203.01, 203.03, 205
See application file for complete search history.

(56) References Cited

U.S. PATENT DOCUMENTS

| | | | |
|---|---|---|---|
| 4,372,455 A | 2/1983 | Cochran | |
| 5,372,400 A | 12/1994 | Enning et al. | |
| 5,398,989 A | 3/1995 | Winter et al. | |
| 5,577,796 A * | 11/1996 | Clausen | B60R 19/18 29/897.2 |
| 5,720,511 A * | 2/1998 | Benedyk | B60N 2/68 280/798 |
| 5,765,906 A | 6/1998 | Iwatsuki et al. | |
| 5,941,597 A * | 8/1999 | Horiuchi | B62D 25/04 296/193.06 |
| D419,076 S | 1/2000 | Dull | |
| 6,073,993 A | 6/2000 | Iwatsuki et al. | |
| 6,283,549 B1 | 9/2001 | Husemann | |
| 6,293,617 B1 | 9/2001 | Sukegawa | |

(Continued)

FOREIGN PATENT DOCUMENTS

| | | |
|---|---|---|
| CN | 101195387B B | 5/2013 |
| DE | 19519779 A1 | 12/1995 |

(Continued)

OTHER PUBLICATIONS

Firehouse.com, "Thread: Boron B-Pillar Cross Sections", Maximum Performance Minimal Time, Mar. 29, 2011, http://www.firehouse.com/forums/t120166/, downloaded Dec. 1, 2015, 10 pp.

(Continued)

*Primary Examiner* — Gregory A Blankenship
(74) *Attorney, Agent, or Firm* — Young Basile Hanlon & MacFarlane, P.C.

(57) ABSTRACT

A vehicle body structure, includes a structural pillar that is located adjacent to a passenger compartment. The structural pillar has an elongate aluminum extrusion that has a peripheral wall that defines a closed cross-sectional shape. The peripheral wall has at least a first portion that is oriented toward the passenger compartment, and a stiffening structure that is connected to the first portion of the elongate aluminum extrusion.

17 Claims, 5 Drawing Sheets

(56) References Cited

U.S. PATENT DOCUMENTS

| | | | |
|---|---|---|---|
| 6,332,643 B1 | 12/2001 | Sukegawa et al. | |
| 6,460,920 B1* | 10/2002 | Reinsch | B60J 10/80 296/203.03 |
| 6,561,571 B1* | 5/2003 | Brennecke | B62D 29/002 264/277 |
| 6,854,790 B2* | 2/2005 | Yoshida | B62D 21/15 296/187.05 |
| 8,530,015 B2* | 9/2013 | Mendiboure | B62D 29/002 296/187.02 |
| 8,899,670 B2* | 12/2014 | Kim | B62D 25/04 296/210 |
| 8,998,307 B1* | 4/2015 | Joyce | B62D 29/008 296/193.12 |
| 9,302,710 B2* | 4/2016 | Bach | B62D 25/06 |
| 9,440,678 B2* | 9/2016 | Kurokawa | B62D 21/02 |
| 9,598,112 B1* | 3/2017 | Bach | B62D 25/04 |
| 9,751,568 B2* | 9/2017 | Bach | B62D 25/02 |
| 2001/0020797 A1* | 9/2001 | Saeki | B62D 21/15 296/203.03 |
| 2003/0080590 A1* | 5/2003 | Bruggemann | B62D 21/00 296/205 |
| 2009/0212601 A1* | 8/2009 | Favaretto | B62D 23/005 296/203.01 |
| 2009/0255893 A1 | 10/2009 | Zummo et al. | |
| 2014/0272210 A1* | 9/2014 | Patsy, Jr. | B62D 29/008 428/34.1 |
| 2015/0115665 A1* | 4/2015 | Joyce | B21D 11/10 296/210 |
| 2015/0360281 A1* | 12/2015 | May | B62D 29/008 138/171 |
| 2016/0325786 A1* | 11/2016 | Elfwing | B62D 25/025 |
| 2017/0203790 A1* | 7/2017 | Tyan | B62D 21/15 |

FOREIGN PATENT DOCUMENTS

| | | |
|---|---|---|
| DE | 19653509 A1 | 6/1998 |
| EP | 0823363 A2 | 2/1998 |

OTHER PUBLICATIONS

Benteler Automotive, "Lightweight Applications Using Aluminum Tailored Extrusions", Sivanathan Prasoody, Date Unknown, 17 pp.
Firehouse.Com, "Thread: Volvo A—Pillar With Boron Pipe Inside", Maximum Performance Minimal Time, Aug. 21, 2011, downloaded Dec. 1, 2015, http://www.firehouse.com/forums/t122163/, 10 pp.

* cited by examiner

INTERNALLY STIFFENED BODY STRUCTURE

CROSS-REFERENCE TO RELATED APPLICATIONS

This application claims the benefit of U.S. Provisional Application No. 62/264,017, filed on Dec. 7, 2015, the content of which is hereby incorporated by reference in its entirety for all purposes.

FIELD

The disclosure relates generally to the field of vehicle body structures.

BACKGROUND

Typical vehicle body structures include structural pillars support portions of the vehicle such as the roof. As an example, most vehicles include structural pillars referred to as "A-pillars," which are positioned adjacent to a windshield and forward of a front door of the vehicle, as well as "B-pillars" that are positioned rearward of the front door of the vehicle. The A-pillars and B-pillars of vehicles function to support the roof of the vehicle and to define an opening into the passenger compartment of the vehicle.

The size of each structural pillar is selected such that the structural pillar satisfies certain strength requirements. For example, structural pillars are usually designed to provide a certain degree of resistance to deformation during a crash. Typical solutions for increasing the strength of structural pillars include increasing the amount of material used to make the pillar such as by enlarging the cross-sectional size of the pillar or by increasing the thickness of the walls of the pillar, or using a high strength material. Typical materials are high strength steels such as boron steel. These approaches increase the weight of the vehicle and/or compromise sight lines out of the vehicle.

SUMMARY

One aspect of the disclosure is a vehicle body structure, that includes a structural pillar that is located adjacent to a passenger compartment. The structural pillar has an elongate aluminum extrusion that has a peripheral wall that defines a closed cross-sectional shape. The peripheral wall has at least a first portion that is oriented toward the passenger compartment, and a stiffening structure that is connected to the first portion of the elongate aluminum extrusion.

Another aspect of the disclosure is a structural pillar for a vehicle body structure that includes an internal structural member that is elongate and has a cross-sectional shape along its length from a first end to a second end. The cross-sectional shape defines a hollow interior and a stiffening structure. An exterior portion covers at least part of the internal structural member.

Another aspect of the disclosure is a vehicle body structure that includes a structural pillar that is located adjacent to a passenger compartment and includes a first internal structural member and a first exterior portion. The first internal structural member has a cross-sectional shape along its length from a first end to a second end. The cross-sectional shape defines a hollow interior and a stiffening structure. The first exterior portion covers at least part of the internal structural member. The vehicle body structure also includes a header that is located adjacent to the passenger compartment and includes a second internal structural member and a second exterior portion. The vehicle body structure also includes a cant rail that is located adjacent to the passenger compartment and includes a third internal structural member and a third exterior portion. The vehicle body structure also includes a joint that is connected to the structural pillar, the header, and the cant rail.

DETAILED DESCRIPTION

This disclosure relates to body structures for vehicles. Typical solutions for increasing the strength of vehicle body structures such as structural pillars include increasing the amount of material used to make the pillar, such as by enlarging the cross-sectional size of the pillar or by increasing the thickness of the walls of the pillar. During an impact, many of these designs fail by buckling instead of by yielding. Failure by buckling is a localized failure that indicates an inefficient design, because the full ability of the material to resist the impact has not been utilized. The vehicle body structures described herein are configured to avoid failure by buckling for common impact types by incorporation of internal stiffening structures. For example, the vehicle body structures described herein can incorporate one or more structural beams or structural pillars that incorporate an internal stiffening structure.

Figure 1:
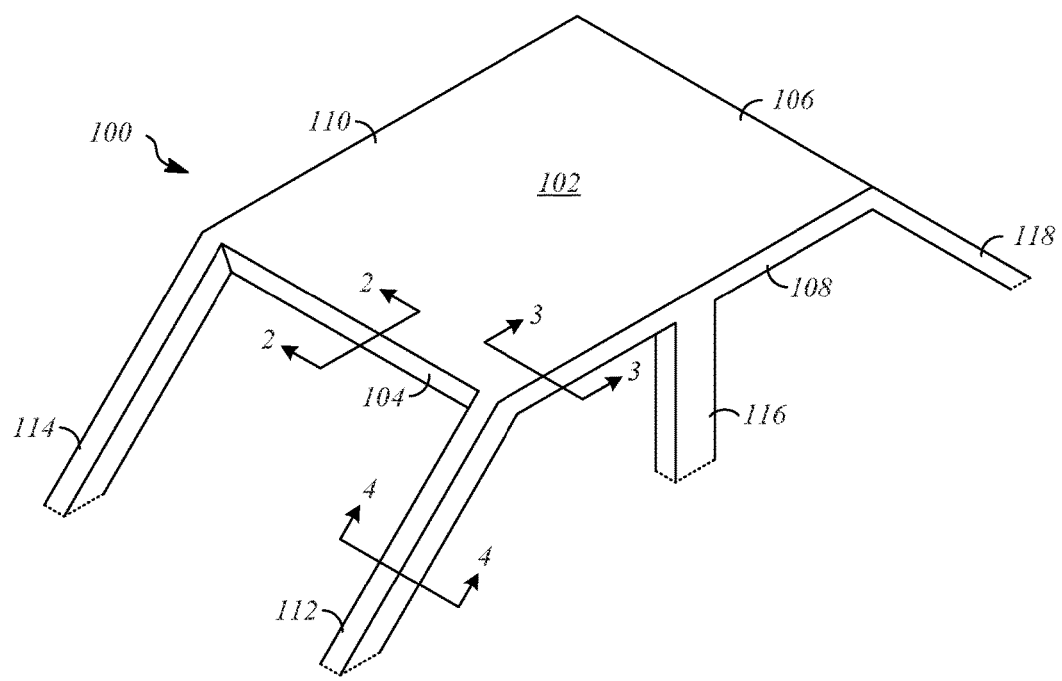
FIG. 1 is a perspective view illustration showing a portion of a vehicle body.

FIG. 1 shows a portion of a vehicle body 100 that includes a roof panel 102 that is supported by a plurality of structural pillars or beams. In the illustrated example the roof panel 102 is bordered by a front header 104 positioned at a front end of the roof panel 102, a rear header 106 positioned at a rear end of the roof panel 102, a left-side cant rail 108 positioned at a left side of the roof panel 102, and a right-side cant rail 110 positioned at a right side of the roof panel 102.

The vehicle body 100 may include a left-side a-pillar 112, a right-side a-pillar 114, a left-side b-pillar 116, a right side b-pillar (not shown), a left-side c-pillar 118, and a right side c-pillar (not shown). The left-side a-pillar 112 can be connected to the front header 104 and to the left-side cant rail 108. The right-side a-pillar 114 can be connected to the front header 104 and to the right-side cant rail 110. The left-side b-pillar 116 can be connected to the left-side cant rail 108, and the right-side b-pillar can be connected to the right-side cant rail 110. The left-side c-pillar 118 can be connected to the rear header 106 and to the left-side cant rail 108. The right-side c-pillar can be connected to the rear header 106 and to the right-side cant rail 110. Each of the front header 104, the rear header 106, the left-side cant rail 108, the right-side cant rail 110, the left-side a-pillar 112, the right-side a-pillar 114, the left-side b-pillar 116, the right side b-pillar, the left-side c-pillar 118, and the right side c-pillar can each border one or more window or door openings that are defined by the vehicle body 100.

Figure 2:
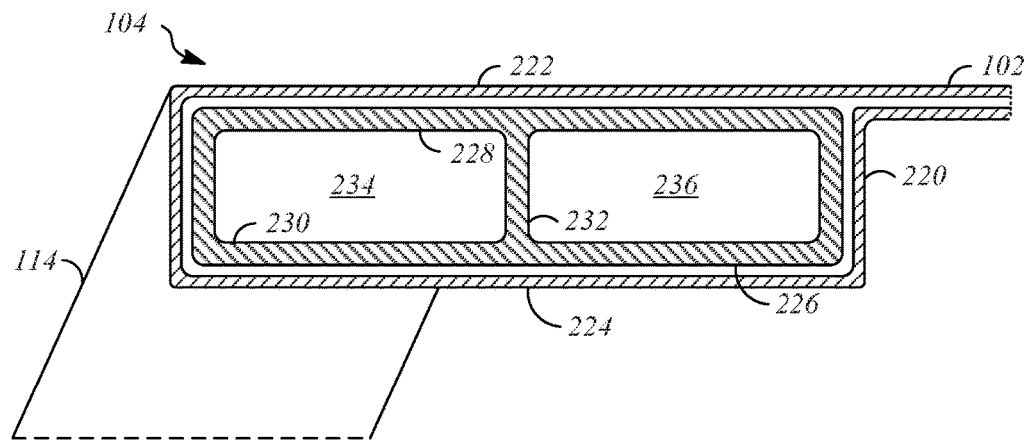
FIG. 2 is a cross-section illustration showing a front header of the vehicle body.

As shown in FIG. 2, the front header 104 includes an exterior portion 220 and an internal structural member 226. The exterior portion 220 can be fabricated from sheet metal or other suitable vehicle body materials. In some implementations, the exterior portion 220 is a structural portion of the vehicle body 100. In other implementations, the exterior portion 220 is a non-structural cladding for the internal structural member 226. In other implementations, the exterior portion 220 is omitted. Some parts of the exterior portion 220 may be visible when the vehicle is fully assembled, such an upper surface 222 of the exterior portion 220, which faces the outside of the vehicle body 100, defines part of the vehicle body 100, and may be part of a continuous surface that also defines the roof panel 102. Other parts of the exterior portion 220 may be concealed by interior trim panels (not shown), such as a lower surface 224 that faces the interior of the vehicle. In the illustrated example, the exterior portion 220 forms a generally rectangular cross-sectional shape that surrounds and substantially encloses the internal structural member 226.

The internal structural member 226 is disposed inside the exterior portion 220 of the front header 104. In the illustrated implementation, the exterior portion 220 completely covers and conceals the internal structural member 226 such that the internal structural member 226 is not a visible portion of the vehicle body 100. In one alternative implementation, at least a portion of the internal structural member 226 is exposed, and the exterior portion 220 serves as a cover, made of metal or other suitable material, that covers at least a portion of the internal structural member 226. In another alternative implementation, the exterior portion is omitted and the external surfaces of the internal structural member 226 are exposed. In such an implementation the structural members described herein are not internal in nature, but all disclosure herein relating to internal structural members remains applicable.

The internal structural member 226 is a structural portion of the vehicle body 100 and contributes to the ability of the vehicle body 100 to absorb energy during an impact through controlled deformation while limiting intrusion of body structures into the passenger compartment of the vehicle. The internal structural member 226 can be an elongate beam having a consistent cross-section along its length from a first end to a second end opposite the first end. The internal structural member 226 may be straight, or may be curved to follow a curved contour of the front header 104 and the exterior portion 220.

The internal structural member 226 has a peripheral wall that defines a closed cross-sectional shape and surrounds a hollow interior of the internal structural member 226. As in the illustrated example, the cross-sectional shape of the peripheral wall can be generally rectangular. The peripheral wall is defined in part by an upper wall 228 and a lower wall 230. The upper wall 228 is adjacent to the exterior of the vehicle body 100 and its outer surface is oriented toward the exterior of the vehicle body 100. The lower wall 230 is adjacent to part of the interior of the vehicle body 100, such as the passenger compartment, and its outer surface is oriented toward the interior of the vehicle body 100.

The internal structural member 226 includes a stiffening structure. The stiffening structure can be a geometric feature of the internal structural member 226 that is configured to improve structural performance of the internal structural member 226 during an impact. The stiffening structure can be connected to a portion of the internal structural member 226, such as by forming the stiffening structure as an integral part of the internal structural member 226.

As in the illustrated example, the stiffening structure may be a shear web 232. The shear web 232 is an internal wall of the internal structural member 226 that is formed entirely within the boundary of the peripheral wall and does not modify the general shape of the peripheral wall. The shear web 232 extends from the upper wall 228 to the lower wall 230, and subdivides the interior of the internal structural member 226 into a first hollow space 234 positioned on a first side of the shear web 232 and a second hollow space 236 positioned on second side of the shear web 232 opposite the first side. The shear web 232 transfers load between upper wall 228 and the lower wall 230. This provides a more consistent stress distribution during an impact when one of the upper wall 228 and the lower wall 230 is subjected to tensile loading while the other of the upper wall 228 and the lower wall 230 is subjected to compressive loading. The shear web 232 can also enhance resistance to localized buckling.

The shear web 232 can extend at a generally transverse angle relative to the portions of the peripheral wall of the internal structural member that it is connected to. As in the illustrated example, the shear web 232 may extend generally perpendicular to one or more portions of the peripheral wall of the internal structural member 226, such as the upper wall 228 and the lower wall 230. Although the internal structural member 226 includes a single shear web in the illustrated example, more than one shear web can be included.

The internal structural member 226 can be a one-piece structure. Forming the internal structural member 226 as a one-piece structure allows for high strength. Suitable techniques for forming the internal structural member 226 as a one-piece structure include extrusion, molding, and casting.

The internal structural member 226 can be an aluminum extrusion, which is an example of forming the internal structural member 226 as a one-piece structure. Forming the internal structural member 226 as an aluminum extrusion allows for high strength while reducing weight and footprint relative to other material choices and structural configurations. Portions of the internal structural member 226 can be formed as an integral structure when the internal structural member is formed as an aluminum extrusion. In the illustrated example, the internal structural member 226 is an aluminum extrusion that includes the upper wall 228, the lower wall 230, and the shear web 232 as integrally formed portions. When formed as an aluminum extrusion, the various features and portions of the internal structural member 226, such as the peripheral wall and the shear web 232, can extend continuously from one longitudinal end of the aluminum extrusion to the opposite longitudinal end of the aluminum extrusion.

The rear header 106 of the vehicle body 100 can have a structural configuration that is similar to that of the front header 104.

Figure 3:
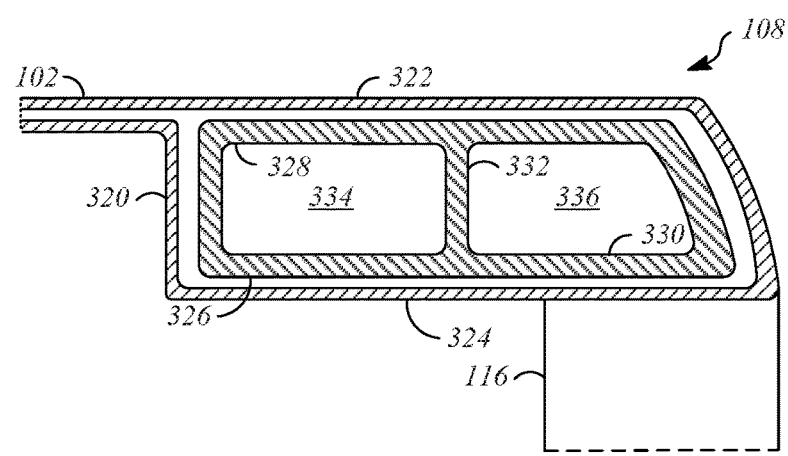
FIG. 3 is a cross-section illustration showing a left-side cant rail of the vehicle body.

As shown in FIG. 3, the left-side cant rail 108 includes an exterior portion 320 and an internal structural member 326. The left-side cant rail 108 is similar to the front header 104 except as otherwise described.

The exterior portion 320 of the left-side cant rail 108 includes an upper surface 322 that is part of the exterior of the vehicle body 100 and can be part of the roof panel 102. The exterior portion 320 also includes a lower surface 324 that is oriented toward the interior of the vehicle body 100, such as by facing the passenger compartment.

The internal structural member 326 of the left-side cant rail 108 is similar to the internal structural member 226 of the front header 104. The internal structural member 326 includes a peripheral wall that surrounds a hollow interior of the structural member 226 and is defined in part by an upper wall 328, a lower wall 330, and a shear web 332 that extends between and is connected to each of the upper wall 328 and the lower wall 330. The shear web 332 divides the interior of the internal structural member 326 into a first hollow space 334 and a second hollow space 336. The internal structural member 326 can be formed as a one-piece structure and may be, for example, an aluminum extrusion.

The right-side cant rail 110 of the vehicle body 100 can have a structural configuration that is similar to that of the left-side cant rail 108.

Figure 4:
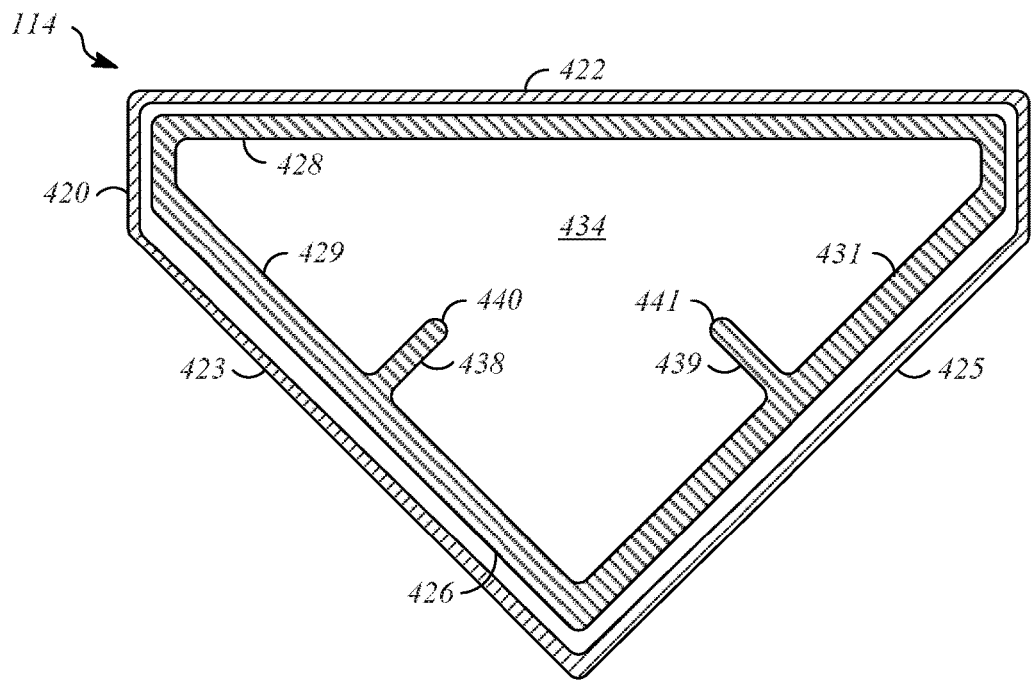
FIG. 4 is a cross-section illustration showing a left-side a-pillar of the vehicle body.

As shown in FIG. 4, the left-side a-pillar 112 includes an exterior portion 420 and an internal structural member 426. The left side a-pillar 112 is similar to the front header 104 except as otherwise described.

The exterior portion 420 of the left-side a-pillar 112 includes an outer surface 422 that is part of the exterior of the vehicle body 100. The exterior portion 420 also includes a first inner surface 423 and a second inner surface 425 that are each oriented toward the interior of the vehicle body 100, such as by facing the passenger compartment. The outer surface 422, the first inner surface 423, and the second inner surface 425 can cooperate to define a generally triangular cross-sectional shape for the exterior portion 420 of the left-side a-pillar 112.

The internal structural member 426 of the left-side a-pillar 112 is similar to the internal structural member 226 of the front header 104. The internal structural member 426 can be formed as a one-piece structure and may be, for example, an aluminum extrusion. The internal structural member 426 includes a peripheral wall that is defined in part by an outer wall 428, a first inner wall 429, and a second inner wall 431. The outer wall 428, the first inner wall 429, and the second inner wall 431 surround and define a hollow space 434 within the internal structural member 426 of the left-side a-pillar 112. The outer wall 428, the first inner wall 429, and the second inner wall 431 define a generally triangular shape for the internal structural member 426, with the outer wall 428 oriented toward the exterior of the vehicle body 100, the first inner wall 429 oriented toward the interior of the vehicle body 100 (e.g. facing the passenger compartment), and the second inner wall 431 oriented toward the interior of the vehicle body 100 (e.g. facing the passenger compartment). Thus, the peripheral wall defines a closed cross-sectional shape for the internal structural member 426 and the peripheral wall surrounds the hollow space 434.

The internal structural member 426 includes one or more stiffening structures that are each attached only to a single portion of the peripheral wall. As shown in the illustrated example, the internal structural member 426 can include two stiffening structures, a first stiffening rib 438 and a second stiffening rib 439. The first stiffening rib 438 extends inward into the hollow space 434 from an internal surface of the first inner wall 429. The second stiffening rib 439 extends inward into the hollow space 434 from an internal surface of the second inner wall 431. As in the illustrated example, the first stiffening rib 438 and a second stiffening rib 439 can extend generally perpendicular to the first inner wall 429 and the second inner wall 431, respectively. Inward from the first inner wall 429 and the second inner wall 431, respectively, the first stiffening rib 438 and a second stiffening rib 439, each terminate at respective free ends 440, 441. The first stiffening rib 438 and a second stiffening rib 439 are placed on the compressive-critical walls of the internal structural member 426, which in this example are the first inner wall 429 and the second inner wall 431. The first stiffening rib 438 and a second stiffening rib 439 enhance stiffness and improve resistance to localized buckling.

The right-side a-pillar 114 of the vehicle body 100 can have a structural configuration that is similar to that of the left-side a-pillar 112. The left-side b-pillar 116, the right side b-pillar, the left-side c-pillar 118, and the right side c-pillar, can all also have structural configurations and features that are similar to the structural configurations and features of the front header 104, the left-side cant rail 108, and the left-side a-pillar 112.

Figure 5:
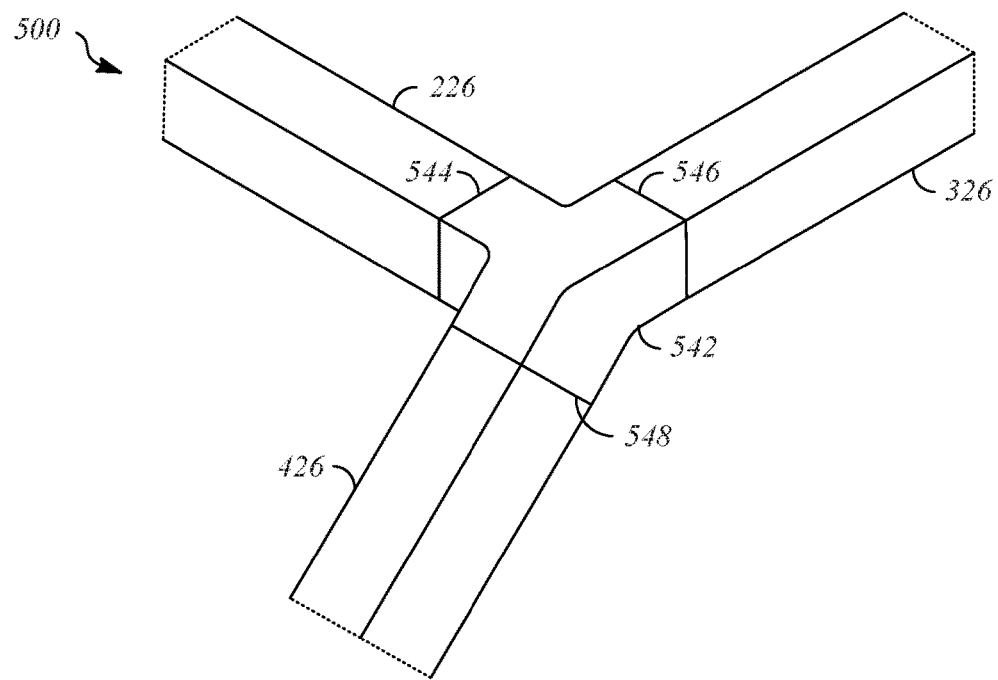
FIG. 5 is a perspective view illustration showing a sub-assembly that includes a joint.

FIG. 5 shows a subassembly 500 that includes a joint 542. The joint 542 interconnects the internal structural members 226, 326, 426 of the front header 104, the left-side cant rail 108, and the left-side a-pillar 112. The joint 542 can be formed in any suitable manner such as casting, molding, or machining. In the illustrated example, the joint 542 has a t-shaped configuration that is defined by a first leg 544 that is connected to the internal structural member 226 of the front header 104, a second leg 546 that is connected to the internal structural member 326 of the left-side cant rail 108, and a third leg 548 that is connected to the internal structural member 426 of the left-side a-pillar 112. The joint 542 may be a portion of the vehicle body 100 and may be representative of other joints that may be included in the vehicle body 100 to interconnect other internal structural members.

Figure 6:
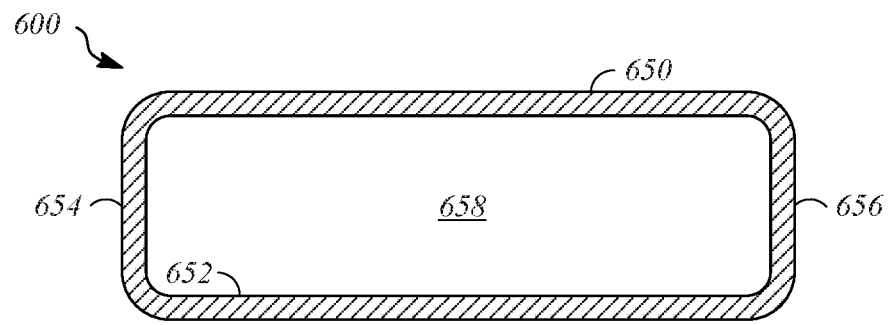
FIG. 6 is a cross-section illustration showing an internal structural member according to a first example.

FIG. 6 is a cross-section illustration showing an internal structural member 600 according to a first example. The internal structural member 600 can be incorporated in a beam or pillar of a vehicle body, as described with respect to the vehicle body 100. The internal structural member 600 can be an elongate member of consistent cross-section, and may be a one-piece structure. For example, the internal structural member 600 can be an aluminum extrusion. The internal structural member 600 has a generally rectangular cross-sectional configuration defined by a peripheral wall defined by first and second long walls 650, 652 and first and second short walls 654, 656 that surround a hollow interior 658.

Figure 7:
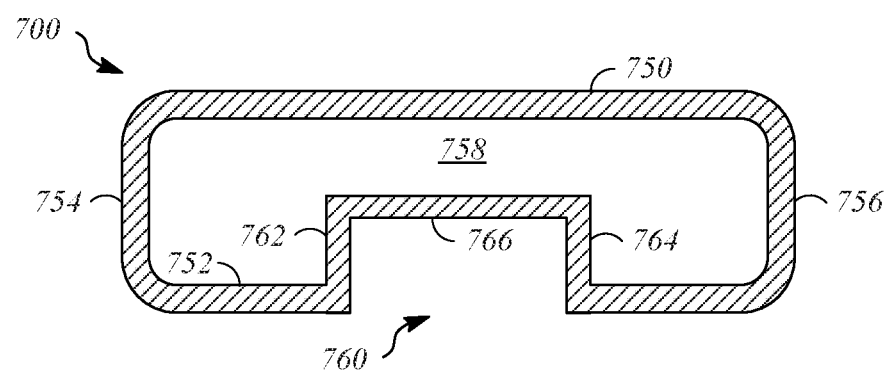
FIG. 7 is a cross-section illustration showing an internal structural member according to a second example.

FIG. 7 is a cross-section illustration showing an internal structural member 700 according to a second example. The internal structural member 700 can be incorporated in a beam or pillar of a vehicle body, as described with respect to the vehicle body 100. The internal structural member 700 can be an elongate member of consistent cross-section, and may be a one-piece structure. For example, the internal structural member 700 can be an aluminum extrusion. The internal structural member 700 has a generally rectangular cross-sectional configuration defined by a peripheral wall defined by a first long wall 750, a second long wall 752, a first short wall 754, and a second short wall 756 that surround a hollow interior 758.

The second long wall 752 is interrupted by a stiffening structure in the form of an inwardly extending channel 760 that deviates from the generally rectangular cross-sectional shape and is defined by first and second inwardly extending wall portions 762, 764 and a laterally extending wall portion 766 that extends between the first and second inwardly extending wall portions 762, 764. In the illustrated example, the length of the laterally extending wall portion 766 is greater than the lengths of the first and second inwardly extending wall portions 762, 764.

Figure 8:
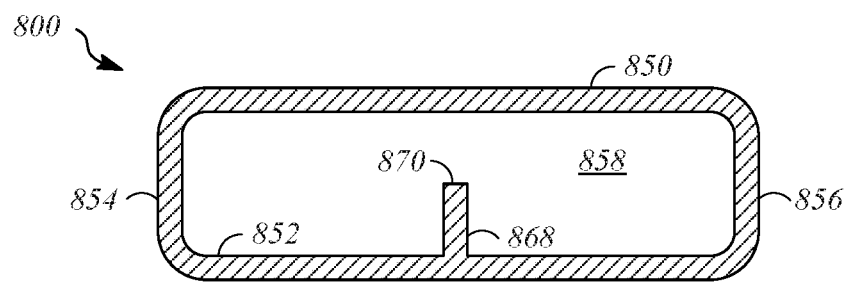
FIG. 8 is a cross-section illustration showing an internal structural member according to a third example.

FIG. 8 is a cross-section illustration showing an internal structural member 800 according to a third example. The internal structural member 800 can be incorporated in a beam or pillar of a vehicle body, as described with respect to the vehicle body 100. The internal structural member 800 can be an elongate member of consistent cross-section, and may be a one-piece structure. For example, the internal structural member 800 can be an aluminum extrusion. The internal structural member 800 has a generally rectangular cross-sectional configuration defined by a peripheral wall defined by first and second long walls 850, 852 and first and second short walls 854, 856 that surround a hollow interior 858. A stiffening structure in the form of a stiffening rib 868 extends from an interior surface of the second long wall 852 to a free end 870. The stiffening rib 868 may extend generally perpendicular to the second long wall 852, as in the illustrated example.

Figure 9:
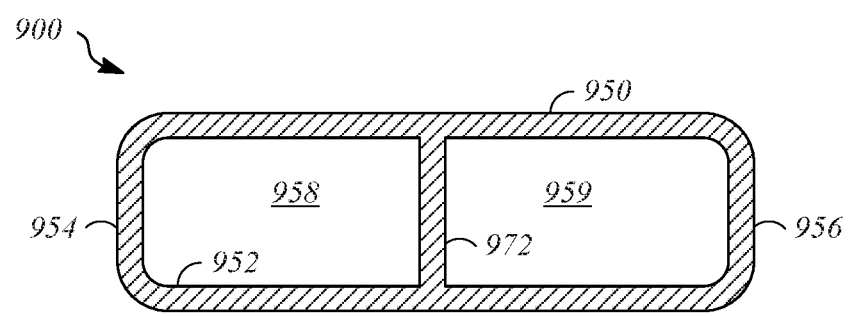
FIG. 9 is a cross-section illustration showing an internal structural member according to a fourth example.

FIG. 9 is a cross-section illustration showing an internal structural member 900 according to a fourth example. The internal structural member 900 can be incorporated in a beam or pillar of a vehicle body, as described with respect to the vehicle body 100. The internal structural member 900 can be an elongate member of consistent cross-section, and may be a one-piece structure. For example, the internal structural member 900 can be an aluminum extrusion. The internal structural member 900 has a generally rectangular cross-sectional configuration defined by a peripheral wall defined by a first long wall 950, a second long wall 952, a first short wall 954, and a second short wall 956. A stiffening structure in the form of a shear web 972 extends from an interior surface of the first long wall 950 to an interior surface of the second long wall 952. The shear web 972 divides the interior of the internal structural member 900 into a first hollow space 958 and a second hollow space 959. The shear web 972 may extend generally perpendicular to the first long wall 950 and the second long wall 952, as in the illustrated example. Thus, the peripheral wall surrounds a hollow interior that includes the first hollow space 958 and the second hollow space 959.

Figure 10:
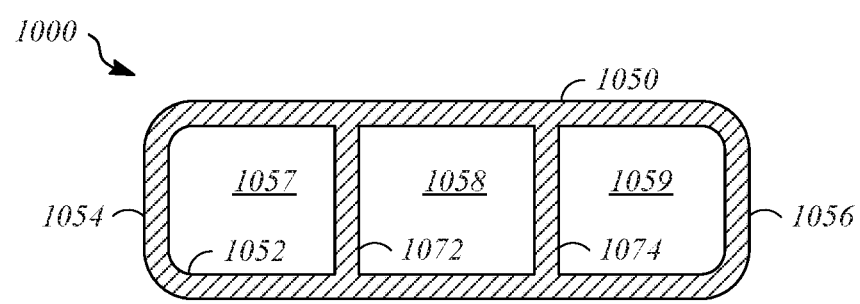
FIG. 10 is a cross-section illustration showing an internal structural member according to a fifth example.

FIG. 10 is a cross-section illustration showing an internal structural member 1000 according to a fifth example. The internal structural member 1000 can be incorporated in a beam or pillar of a vehicle body, as described with respect to the vehicle body 100. The internal structural member 1000 can be an elongate member of consistent cross-section, and may be a one-piece structure. For example, the internal structural member 1000 can be an aluminum extrusion. The internal structural member 1000 has a generally rectangular cross-sectional configuration defined by a peripheral wall defined by a first long wall 1050, a second long wall 1052, a first short wall 1054, and a second short wall 1056. The internal structural member 1000 includes stiffening structure in the form of a first shear web 1072 and a second shear web 1074 that each extend from an interior surface of the first long wall 1050 to an interior surface of the second long wall 1052. The first shear web 1072 and the second shear web 1074 divide the interior of the internal structural member 1000 into a first hollow space 1057, a second hollow space 1058, and a third hollow space 1059. The first shear web 1072 and the second shear web 1074 may extend generally perpendicular to the first long wall 1050 and the second long wall 1052, as in the illustrated example.

Simulations were performed to compare the performance of the internal structural members 600, 700, 800, 900, 1000 of FIGS. 6-10 when incorporated in a vehicle body such as the vehicle body 100. Similar loading conditions were applied to each of the structural members to compare weight, footprint (area), and stiffness for the structural members. In the simulated test, the internal structural member 600 weighed 3.61 kg, had a footprint of 60.75 square centimeters, and a stiffness of 90.4 N/mm; the internal structural member 700 weighed 3.96 kg, had a footprint of 49.28 square centimeters, and a stiffness of 79.7 N/mm; the internal structural member 800 weighed 3.57 kg, had a footprint of 52.92 square centimeters, and a stiffness of 77.0 N/mm; the internal structural member 900 weighed 3.71 kg, had a footprint of 50.43 square centimeters, and a stiffness of 76.5 N/mm; and the internal structural member 1000 weighed 4.03 kg, had a footprint of 48.0 square centimeters, and a stiffness of 75.1 N/mm.

What is claimed is:

1. A vehicle body structure, comprising:
a structural pillar that is located adjacent to a passenger compartment, the structural pillar has an elongate aluminum extrusion that has a peripheral wall, a first stiffening rib, and a second stiffening rib, wherein:
the peripheral wall defines a generally triangular closed cross-sectional shape and one or more hollow spaces within the elongate aluminum extrusion,
the peripheral wall has an outer wall portion facing away from the passenger compartment, a first inner wall portion facing toward the passenger compartment, and a second inner wall portion facing toward the passenger compartment,
the first stiffening rib is formed on a first internal surface of the first inner wall portion, extends inward from the first inner wall portion into the one or more hollow spaces, and terminates at a first elongate free end, and
the second stiffening rib is formed on a second internal surface of the second inner wall portion and extends inward from the second inner wall portion into the one or more hollow spaces, and terminates at a second elongate free end.

2. The vehicle body structure of claim 1, wherein the peripheral wall extends from a first end of the elongate aluminum extrusion to a second end of the elongate aluminum extrusion.

3. The vehicle body structure of claim 1, wherein the structural pillar includes an exterior portion that covers at least part of the elongate aluminum extrusion.

4. The vehicle body structure of claim 3, wherein the exterior portion surrounds the elongate aluminum extrusion.

5. The vehicle body structure of claim 3, wherein the exterior portion is formed from metal.

6. The vehicle body structure of claim 3, wherein the exterior portion encloses the elongate aluminum extrusion.

7. The vehicle body structure of claim 3, wherein the elongate aluminum extrusion is disposed inside the exterior portion.

8. A structural pillar for a vehicle body structure, comprising:
an internal structural member that is elongate and has a cross-sectional shape along its length from a first end to a second end, wherein the cross-sectional shape defines a hollow interior and a stiffening structure; and
an exterior portion that that surrounds and encloses the internal structural member, such that the internal structural member is disposed inside the exterior portion,
wherein the internal structural member includes a peripheral wall that surrounds the hollow interior of the internal structural member and extends from the first end of the internal structural member to the second end of the internal structural member, wherein the stiffening structure includes a rib that is formed on an internal surface of the peripheral wall and extends inward from the peripheral wall into the hollow interior of the internal structural member, and wherein the rib includes an elongate free end that is adjacent to the hollow interior of the internal structural member.

9. The structure pillar of claim 8, wherein the internal structural member is a one-piece structure.

10. The structural pillar of claim 8, wherein the internal structural member is an aluminum extrusion.

11. The structural pillar of claim 8, wherein the stiffening structure includes one or more shear webs.

12. The structural pillar of claim 11, wherein the internal structural member includes a first wall portion and a second wall portion, and the one or more shear webs each extend from the first wall portion to the second wall portion.

13. A vehicle body structure, comprising:

a structural pillar that is located adjacent to a passenger compartment and includes a first internal structural member and a first exterior portion, wherein the first internal structural member has a cross-sectional shape along its length from a first end to a second end, the cross-sectional shape defines a hollow interior and a stiffening structure, and the first exterior portion covers at least part of the first internal structural member;

a header that is located adjacent to the passenger compartment and includes a second internal structural member and a second exterior portion;

a cant rail that is located adjacent to the passenger compartment and includes a third internal structural member and a third exterior portion; and a joint having a t-shaped configuration including a first leg that is connected to the first internal structural member of the structural pillar, a second leg that is connected to the second internal structural member of the header, and a third leg that is connected to the third internal structural member of the cant rail.

14. The vehicle body structure of claim 13, wherein the first internal structural member is a first elongate aluminum extrusion, the second internal structural member is a first elongate aluminum extrusion, and the third internal structural member is a first elongate aluminum extrusion.

15. The vehicle body structure of claim 13, wherein the joint is a cast structure.

16. The vehicle body structure of claim 13, wherein the joint is a molded structure.

17. The vehicle body structure of claim 13, wherein the joint is a machined structure.

* * * * *